2,999,103
16-NITRO-ALKYL STEROIDS

Richard Rausser, Union, and Eugene P. Oliveto, Glen Ridge, N.J., assignors to Schering Corporation, Bloomfield, N.J., a corporation of New Jersey
No Drawing. Filed May 1, 1959, Ser. No. 810,264
25 Claims. (Cl. 260—397.45)

This invention relates to novel steroids and to methods of preparing the same. More particularly the present invention is concerned with novel 16-nitroalkyl pregnenes, and explicitly 16α-(α-nitroalkyl)-4-pregnenes, the 9α-halogeno derivatives and 21-esters thereof, and the corresponding 16α-(α-nitroalkyl)-1,4-pregnadienes; and to the preparation thereof which includes reacting a steroid having the pregnane carbon skeleton and a 16,17-double bond conjugated with a ketonic oxygen at the C-20 position, with a nitroalkane and introducing a 17α-hydroxy group into the resultant nitroalkyl pregnane to cause the formation of a 16α-(α-nitroalkyl)-17α-hydroxypregnane which is or is convertible to the novel compounds of our invention as described more fully hereinafter. The terms, "pregnane" and "pregnene" as thus employed are intended to include both pregnenes and pregnadienes.

This application is a continuation-in-part of U.S. application Serial No. 733,843, filed May 8, 1958 by Richard Rausser and Eugene P. Oliveto, the inventors herein.

The novel pregnenes of our invention are represented by the following general formula:

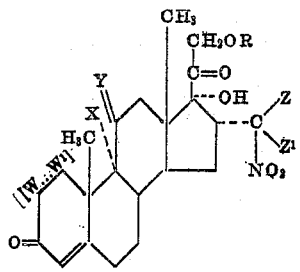

wherein [W ... W¹] is $CH_2$—$CH_2$ or $CH$=$CH$; Y represents ketonic oxygen, (H, αOH) or (H, βOH); X is hydrogen or a halogen atom of an atomic weight less than 125, (i.e. fluorine, chlorine or bromine) and wherein X is hydrogen when Y is (H, αOH); each of Z and $Z^1$ is a member selected from the group consisting of hydrogen and an alkyl radical; and R is either hydrogen phosphate or acyl. Suitable acyl substituents at the C-21 position are carboxylic acyl radicals and preferably those containing from 1 to 8 carbon atoms such as alkanoates exemplified by acetate, propionate, cyclopentyl propionate, dimethylacetate, trimethylacetate, t-butylacetate, aryl carboxylates such as for example, phenoxyacetate, benzoate, sulfobenzoate, phthalate; and heterocyclic carboxylates such as thiophene carboxylate, nicotinate, and the like.

Illustrative of the α-nitroalkyl substituents at the 16-carbon atom contemplated by our invention are 16α-(nitromethyl), 16α-(α-nitroethyl), 16α-(α-nitropropyl), 16α-(α-nitro-2-methylethyl), 16α-(α-nitrobutyl), 16α-(α-nitroisobutyl), 16α-(α-nitrodecyl), 16α-(α-nitrolauryl) and the like. The preferred α-nitroalkyl groups are the nitro-lower alkyls containing from 1 to 8 and most desirably 1 to 4 carbon atoms.

Certain of the novel compounds of our invention, that is, the 16α-(α-nitroalkyl)- substituted derivatives of cortisone, hydrocortisone, prednisone, and prednisolone, non-halogenated or halogenated in the 9α-position, as well as their C-21 esters (thus explicitly excluding the 11α-hydroxy-16-nitroalkylated corticoids, which however, are valuable as intermediates in the formation of the corresponding 11-keto steroids as described herein), possess, as has been noted above, valuable anti-inflammatory and diuretic (i.e. sodium and water excretory) properties. The nitroalkylated (notably the 16α-nitromethyl-substituted) dienes with or without the 9α-halogen substituent are particularly valuable therapeutic agents possessing significant therapeutic effects in the treatment of inflammatory diseases, such as for example, arthritis, dermatitis, asthma, and the like, and are normally administered in a daily maintenance dosage range of 0.50 to 10 mg.; the preferred daily dosage of the non-halogenated dienes being from about 2 mg. to about 10 mg. and that of the halogenated, and preferably the 9α-fluoro-alkylated dienes, being in the range of 0.5 mg. to 5.0 mg.

The non-halogenated 16α-(α-nitroalkyl) monoenes of our invention, in addition to being valuable intermediates in the formation of the corresponding dienes, are also active as anti-inflammatory agents and in inhibiting renal tubular reabsorption of sodium. A daily dosage of 5 mg. to 50 mg. is recommended for oral administration of these monoenes to induce sodium and water diuresis, e.g. in the treatment of ascities, congestive heart failure and cyclical edema.

Similarly, the 9-halo-16α-(α-nitroalkylated) monoenes of our invention are also useful as anti-inflammatory agents, since they manifest an enhanced activity in the treatment of such inflammatory diseases as arthritis, dermatitis, asthma, and the like. When administered orally, the recommended daily dosage is in the range of 4 mg. to 15 mg.

When treatment so indicates, these 16α-(α-nitroalkylated) dienes and monoenes can be administered parenterally in the form of therapeutically acceptable solutions and suspensions, e.g., in aqueous media, or where oral administration is indicated, can be incorporated into tablets (normally from about 0.50 mg. to 5 mg. per tablet), elixirs and other known pharmaceutical dosage forms by standard procedures. They can also be administered topically in the form of ointments or creams, or as solution, e.g. in dimethylacetamide or diethylacetamide, or in the form of suppositories dissolved or suspended in a fatty or waxy vehicle which melt at approximately body temperature, or as aerosols when mixed with suitable materials, such as isopropyl myristate and dichloro difluoromethane (Freon).

It has been known heretofore that the substitution of an α-halogen atom for hydrogen at the C-9 position will enhance the anti-inflammatory properties of the corresponding parent steroid, e.g. prednisone, prednisolone, cortisone, hydrocortisone. Unfortunately, a concomitant and significant increase in the salt retaining properties of such 9α-halogenated derivatives occurs. It is worthy of particular note, therefor, that the 9α-halogeno-16-(α-nitroalkyl) compounds of the present invention effect the retention of the enhanced anti-inflammatory activity afforded by the presence of the 9α-halogen while inhibiting the anticipated increase in salt retention above referred to. Similarly the salt retaining properties of the non-halogenated steroids such as for example, cortisone and hydrocortisone, are markedly and effectively reduced in their corresponding 16α-(α-nitroalkyl) derivatives.

The compounds of the present invention while possessing unique chemotherapeutic utility per se, are of particular value, due to their mode of preparation as compared to that of the corresponding 16-alkyl steroids described in the aforesaid co-pending application Serial No. 733,843. As noted therein, the novel 16α-(α-nitroalkyl) compounds of the present invention can also be employed in the preparation of the 16α-alkyl and 16β-alkyl steroids of that application. The reaction sequence for the preparation of 16α-methyl- and 16β-methyl steroids from the corresponding 16α-nitromethyl steroids is as follows. The 16α-nitromethyl derivative is reduced, e.g. with tin and hydrochloric acid, to the 16α-aminomethyl steroid, which, in turn, is quaternized with methyl iodide and subsequently pyrolyzed to form the corresponding 16-methylene derivative, which, in turn, converts to the 16-methyl-20-keto-16(17)-dehydro compound. Peroxidation of this latter product with hydrogen peroxide will cause the formation of the 16α,17α-oxido, 16β-methyl-20-keto steroid which when reacted with hydrobromic acid, for example, forms the intermediate bromohydrin which rapidly dehydrobrominates and is then reduced to yield a mixture (separable by column chromatography) of 16α-methyl and 16β-methyl derivatives of, for example, 4-pregnene-17α,21-diol-3,11,20-trione, 4-pregnene - 11β,17α,21 - triol-3,20-dione and their 9α-halo (e.g. fluoro) derivatives. These monoenes can be converted to the corresponding 1,4-dienes microbiologically employing, for example, the microorganism *Bacillus sphaericus* (A.T.C.C. 7055) or *Corynebacterium simplex* (A.T.C.C. 6946). These reaction steps are carried out by procedures well known to steroid chemists. It will, for example, be evident that, should higher homologues of nitromethane be employed (e.g. nitroethane, 2-nitropropane, nitrobutane and the like) on a 16-dehydrosteroid such as 3α-acetoxy-16-pregnene-11,20-dione and the resultant product taken through the procedural steps described above, the corresponding alkyl homologues will result in the C–16 position (e.g. 16-ethyl-16-dehydro-20-ketosteroids, 16-isopropyl-16-dehydro-20-ketosteroids etc.). The 16-alkyl-16-dehydro-20-ketosteroids resulting from the pyrolysis of the quaternized steroids can be converted to corticoids in the manner already described, e.g., hydrogenation of the double bond with palladium on carbon or Raney nickel, introduction of the 17-hydroxy group by means of enolacylation, preferably enolacetylation and peroxidation (e.g. acetic anhydride and p-toluenesulfonic acid followed by treatment with peracetic acid and sequential treatment with dilute alkali (e.g. NaOH)), introduction of the 21-acetate by means of bromination and acetoxylation (sodium acetate in dimethylformamide) and elaboration of the A-ring in the conventional manner to introduce the Δ⁴- or Δ¹,⁴-double bond(s) and 3-keto group. Alternatively, they may be epoxidized with alkaline hydrogen peroxide to yield 16α,17α-epoxy, 16β-alkyl-20-keto steroids. These are then treated with a hydrohalic acid such as hydrogen bromide and reduced, e.g. with Raney nickel or palladium and hydrogen. This results in the formation of both 16α-alkyl-17α-hydroxy-20-keto steroids, and 16β-alkyl-17α-hydroxy-20-keto steroids. After separation, e.g., by column chromatography, these are then handled in the usual fashion, e.g., the 21-acetate is introduced via bromination and acetoxylation, and the A-ring elaborated via oxidation of the 3-hydroxyl, followed by bromination-dehydrobromination to give an unsaturated 3-ketone.

The 16α-(α-nitro-lower alkyl) compounds of our invention are desirably prepared by the procedure, wherein a 3-oxygenated 20-keto-16-pregnene such as illustratively, 3α-hydroxy-16-pregnene-11,20-dione, is reacted with a lower nitroalkane, such as for example, nitromethane, in the presence of a strong base to effect the production of the corresponding saturated 16α-(nitromethyl) derivative, a 3-oxygenated 20-keto - 16α - (α-nitromethyl)-pregnane, e.g., 3α-hydroxy-16α-(α-nitromethyl) - pregnane-11,20-dione. The nitromethane is employed merely for purposes of illustration, but it will be apparent that where it is desired to prepare other 16α-(α-nitro-lower alkyl) compounds such as the corresponding 16α-(α-nitroethyl), 16α-(α-nitropropyl) and 16α-(α-nitro-α-methylethyl) substituted steroids, nitroethane, 1-nitropropane and 2-nitropropane respectively are employed.

The product of this nitromethylation reaction, 3α-hydroxy-16α-(nitromethyl)-pregnane-11,20-dione, is then hydroxylated by standard procedures at the C–17 position, as for example, by enolacylation, preferably enolacetylation, and peroxidation e.g. with acetic anhydride and p-toluenesulfonic acid, followed by reaction with peracetic acid and then by alkaline hydrolysis to form 3α,17α-dihydroxy-16α-(nitromethyl)-pregnane-11,20-dione. Introduction of the C–21 acetoxy group, or other ester thereof, is accomplished by known methods, such as for example, by bromination of the C–21 methyl group in an inert solvent such as chloroform with the sequential reaction of this product with sodium or potassium acetate in acetone or dimethylformamide. The product thus formed is 3α,17α,21-trihydroxy-16α-(nitromethyl)-pregnane-11,20-dione 21-acetate. The hydroxyl group at position 3 in this latter compound is then transformed to a keto group, preferably by means of N-bromoacetamide to cause the production of 17α,21-dihydroxy-16α-(nitromethyl) - pregnane - 3,11,20 - trione 21-acetate. Other known equivalent oxidizing agents such as N-bromosuccinimide, chromium trioxide-pyridine, chromium trioxide-acetone-sulfuric acid can, of course, also be employed. The Δ¹,⁴-double bonds are then introduced into the A-ring by dihalogenation, e.g. dibromination of this 3-keto derivative by the rapid introduction of bromine in a suitable non-reactive organic solvent such as dioxane followed by dehydrohalogenation in a conventional manner such as by refluxing the brominated steroid with dimethylformamide in the presence of calcium or lithium carbonate and lithium chloride or collidine or the like. The resultant product is 16α-(nitromethyl)-prednisone 21-acetate.

Also, the 17α,21-dihydroxy-16α-(nitromethyl)-pregnane-3,11,20-trione 21-acetate intermediate obtained by the procedure described above, can be modified by introduction solely of the Δ⁴-double bond to form 16α-(nitromethyl)-cortisone acetate. This is normally accomplished by halogenation of the former compound (preferably with bromine in a medium such as tert.-butyl alcohol), at about 30° C. to 35° C. with subsequent dehydrohalogenation by conventional reaction, as with semicarbazide followed by hydrolysis of the resultant 3-mono-semicarbazone with pyruvic acid or the like.

The 16α-(nitromethyl)-cortisone acetate so formed or the corresponding diene, for example, 16α-(nitromethyl)-prednisone 21-acetate can then be saponified by reaction with conventional hydrolytic reagents such as sodium or potassium bicarbonate, sodium hydroxide, sodium methoxide or p-toluenesulfonic acid to remove the acyl radical at C–21 and form the alcohol, 16α-(nitromethyl)-cortisone, or 16α-(nitromethyl)-prednisone. These compounds can be re-esterified if desired to further enhance the duration of activity, by formation of the propionate, t-butylacetate, trimethylacetate, succinate, phosphate, o-sulfobenzoate and the like.

The 16α-(α-nitro-lower alkyl) substituted cortisone acylates such as the 16α-(α-nitromethyl)-cortisone acetate can also be converted to 16α-(α-nitromethyl)-hydrocortisone by reaction thereof initially with semicarbazide, for example, to produce the 16α-(α-nitromethyl)-cortisone acetate 3,20-bis-semicarbazone, which is reacted with a metal borohydride reducing agent such as sodium or potassium borohydride to reduce the C–11 keto group to the 11β-hydroxy group while simultaneously saponifying the C–12 position to form 16α-(nitromethyl)-hydrocortisone-3,20-bis-semicarbazone. The latter product is then hydrolyzed by conventional procedures, e.g. dilute aqueous hydrochloric acid or pyruvic acid, to form 16α-(nitromethyl)-hydrocortisone. This latter intermediate can then be transformed microbiologically according to procedures analogous to those described in Belgian Patent No. 540,478 employing a dehydrogenating microorganism, e.g. *Corynebacterium simplex* (A.T.C.C. 6946), *Bacillus sphaericus* (A.T.C.C. 7055), to form the valuable anti-inflammatory steroid, 16α-(nitromethyl)-prednisolone. The compound can then in turn be re-esterified, as for example, to form an acylate such as 16α-(nitromethyl)-prednisolone 21-acetate by reaction thereof with acetic anhydride in a suitable non-reactive organic solvent such as pyridine or lutidine and subsequently crystallized out.

In one preferred method the 9α-halogen atom, and preferably the 9α-fluorine atom, is introduced into the 16α-(nitromethyl) monoene and diene 21-esters as represented, for example, by 16α-(nitromethyl)-hydrocortisone acetate and 16α-(nitromethyl)-prednisolone acetate respectively, by first dehydrating 16α-(nitromethyl)-prednisolone acetate, for example, with an alkyl or aryl sulfonyl chloride, e.g., methanesulfonyl chloride, in an alkaline organic media, for example, pyridine, to effect the production of the corresponding Δ$^{9(11)}$-derivative, e.g. 16α-(nitromethyl)-Δ$^{1,4,9(11)}$-pregnatriene-17α,21-diol-3,20-dione 21-acetate and in the case of the monoene, 16α - (nitromethyl) - Δ$^{4,9(11)}$ - pregnadiene - 17α,21-diol-3,20-dione 21-acetate. Placement of a halogen, and preferably bromine at this point in the procedure at the 9α-carbon position is accomplished by conventional means, such as, for example, by reacting the Δ$^{9,(11)}$-steroid with hypobromous acid which can be and indeed is preferably prepared in situ from the reaction of for example N-bromoacetamide and perchloric acid yielding directly the corresponding 9α-bromo-16α-(nitromethyl)-prednisolone 21-acetate, and 9α-bromo-16α-(nitromethyl)-hydrocortisone 21-acetate. Esters of these types are useful anti-inflammatory compounds and are at the same time readily converted by oxidation to the corresponding ketones by known techniques such as, for example, with chromium trioxide in pyridine and readily hydrolyzed at the C-21 position by such standard hydrolytic agents as aqueous methanolic potassium bicarbonate, sodium carbonate, concentrated hydrochloric acid in methanol-chloroform or like substances as disclosed hereinabove, to prepare the corresponding 21-alcohols.

A further method of introducing a 9α-halogen atom into the 16α-nitro monoenes and dienes of our invention utilizes as starting compounds the 9α-bromohydrins prepared as above, which can be refluxed with mild alkali, such as illustratively, sodium acetate in methanol, to form the corresponding 9β,11β-oxido derivatives, 9β,11β - oxido - 16α - (nitromethyl) - Δ$^{1,4}$ - pregnadiene-17α,21-diol-3,20-dione 21-acetate, 9β,11β-oxido-16α-(nitromethyl)Δ$^4$-pregnene-17α,21-diol-21-acetate. These latter compounds are then reacted with hydrogen fluoride in chloroform with or without ethanol and/or tetrahydrofuran to cause the formation of 9α-fluoro-16α-(nitromethyl)-prednisolone acetate and 9α-fluoro-16α-(nitromethyl)-hydrocortisone acetate. Similarly the substitution of anhydrous hydrogen chloride for hydrogen fluoride in this reaction results in the production of the corresponding 9α-chloro derivatives. Again, these compounds can be oxidized to the corresponding 11-ketones by standard agents, e.g. chromium trioxide or N-halosuccinimides, or hydrolyzed to the corresponding 21-alcohols by standard saponification procedures (e.g. aqueous methanolic potassium bicarbonate or concentrated hydrochloric acid in methanol). Thus the preferred halogenated compounds of our invention, 9α-fluoro-16α-(α-nitro-lower alkyl)-prednisolones and 9α-fluoro-16α-(α-nitro-lower alkyl)prednisones and particularly 9α-fluoro-16α-(nitromethyl)-prednisolone and 9α-fluoro-16α-(nitromethyl)-prednisone are prepared by these procedures.

Thus far, we have described as starting materials only compounds which are available from bile acids. There are, however, several other classes of starting material which are extremely useful, e.g. diosgenin and smilagenin. For example, diosgenin is readily converted to 16-dehydropregnenolone which can be converted readily to 16α-(nitromethyl)-pregnenolone by the addition of nitromethane. This compound is selectively hydrogenated, e.g. by means of palladium catalyst, to 16α-(nitromethyl)-allopregnane-3β-ol-20-one and the cortical side chain elaborated in the usual way (enolacetylation at C-17 and epoxidation to give the 17α-hydroxy-20-ketone followed by bromination and acetoxylation at C-21). The C-3 hydroxyl is oxidized to the ketone, a 2,4-dibromide is prepared using bromine and dioxane or other inert solvent and dehydrobromination is effected by means of collidine or dimethylformamide to yield 16α-(nitromethyl)-Δ$^{1,4}$-pregnadiene-17α,21-diol-3,20 - dione 21-acetate. This can be hydroxylated at position C-11 to yield either 16α-(nitromethyl)-prednisolone or 16α-(nitromethyl)-11-epiprednisolone. This last compound may undergo acyloxylation, e.g., acetylation selectively at C-21 to yield a mono acetate with sequential oxidation at C-11 to give 16α-(nitromethyl)-prednisone 21-acetate. Also, 16α-(nitromethyl)-11-epi-prednisolone 21-acetate can be dehydrated at C-11 by tosylation of the C-11α-hydroxyl followed by treatment with sodium acetate to yield 16α-(nitromethyl)-Δ$^{1,4,9(11)}$ - pregnatriene - 17α,21-diol-3,20-dione 21-acetate, a compound previously described as an intermediate for the preparation of 9α-halo-16α-(nitromethyl)-corticoids.

Other important starting materials are the 12-oxygenated sapogenins, such as hecogenin, rockogenin and gentrogenin. For example, hecogenin has been converted to 11-keto-16-dehydro-allopregnane-3β-ol-20-one. A 16α-(nitromethyl)-substituent can be introduced by means of the standard addition of nitromethane and the side chain and A-ring elaborated as described above in the usual manner to contain the Δ$^4$- or Δ$^{1,4}$-double bond(s) and 3-keto group.

The following examples are further illustrative of the invention.

EXAMPLE 1

*16α(Nitromethyl) cortisone 21-acetate*

A. 16α-(NITROMETHYL) PREGNANE-3α-OL-11,20-DIONE

To a solution of 2.0 g. of 16-pregnene-3α-ol-11,20-dione 3-acetate in 50 ml. of t-butyl alcohol containing about 1 gram of potassium t-butylate there is added 3 ml. of nitromethane. The reaction mixture is allowed to stand for 24 hours at room temperature, and then is poured into a large volume of water. The resulting precipitate is filtered, air-dried, and crystallized from acetone-hexane to give 1.3 g. of 16α(nitromethyl) pregnane-3α-ol-11,20-dione.

B. 16α-(NITROMETHYL) PREGNANE-3α,17α-DIOL-11,20-DIONE

A solution of 3.4 g. of 16α-(nitromethyl) pregnane-3α-ol-11,20-dione prepared as in above Example 1A, in 76 ml. of acetic anhydride containing 1.9 g. of p-toluenesulfonic acid is kept at 100° C. for six hours; during which time about 8 ml. of distillate is removed every half hour by the application of vacuum. The resulting oily residue is dissolved in 50 ml. of benzene and washed three times with water, then with a solution of 1.0 g. of sodium acetate in 10 ml. of water. The benzene layer is dried over magnesium sulfate, filtered, and then stirred for 18 hours at 25° C. with a mixture of 0.26 g. of sodium acetate in 6 ml. of commercial 40% peracetic acid. Any excess peracetic acid is then destroyed by the dropwise addition of a solution of 8 g. of sodium sulfite in 25 ml. of water, while maintaining the temperature between 10–20° C. An additional 0.8 g. of sodium sulfite is then added, and the mixture stirred overnight until a starch-iodide test is negative. The benzene layer is separated, washed three times with water, and evaporated. To the resulting residue which is dissolved in 160 ml. of methanol, there is added a solution of 1.8 g. of sodium hydroxide in 20 ml. of water, and the mixture refluxed for 15 minutes. After neutralization with 2 ml. of glacial acetic acid, the solution is concentrated under reduced pressure to a volume of about 40 ml. This concentrate is poured into a mixture of ice and water. The resulting precipitate is filtered and dried, yielding 3.3 g. of a solid which is chromatographed on Florisil. The material eluted with 33–50% ether-hexane is combined and crystallized from acetone-hexane to yield 1.1 g. of 16α-(nitromethyl) pregnane-3α,17α-diol-11,20-dione.

C. 16α-(NITROMETHYL) PREGNANE-3α,17α(21-TRIOL-11,20-DIONE 21-ACETATE

A solution of 181 mg. of 16α-(nitromethyl) pregnane-3α,17α-diol-11,20-dione, prepared as in Example 1B, in 9 ml. of C.P. chloroform (containing a few drops of chloroform previously saturated with hydrogen bromide) is brominated at −25° C. by the addition (over a three hour period) of 83 mg. of bromine in 5 ml. of chloroform. The solvent is distilled in vacuo then 5 ml. of dimethylformamide and 0.5 gram of sodium acetate are added. The mixture is stirred at 60° C. for four hours, then poured into water, and the resulting precipitate is filtered and dried to yield 180 mg. of a solid which on recrystallization from acetone-hexane give 120 mg. of 16α - (nitromethyl) pregnane-3α,17α,21-triol-11,20-dione 21-acetate.

D. 16α-(NITROMETHYL) PREGNANE-17α,21-DIOL-3,11,20-TRIONE 21-ACETATE

A solution of 90 mg. of 16α-(nitromethyl) pregnane-3α,17α,21-triol-11,20-dione 21-acetate (the product of Example 1C) in 15 ml. of 80% acetone-water is cooled to 10° C. One drop of concentratde hydrochloric acid is added, along with 75 mg. of N-bromosuccinimide, and the mixture is kept in the dark for 22 hours at 10° C. Excess sodium sulfite solution is then added, and the mixture concentrated in vacuo to a small volume from which precipitates 60 mg. of a solid which is crystallized from acetone-hexane to give 40 mg. of 16α(nitromethyl) pregnane-17α,21-diol-3,11,20-trione 21-acetate.

E. 4β-BROMO-16α-(NITROMETHYL) PREGNANE-17α,21-DIOL-3,11,20-TRIONE 21-ACETATE

A solution of 84 mg. of 16α-(nitromethyl) pregnane-17α,21-diol-3,11,20-trione 21-acetate in 3 ml. of t-butyl alcohol and 3 ml. of methylene chloride is brominated at 30–35° C. by the rapid addition of a solution of 32 mg. of bromine in 3 ml. of t-butyl alcohol. After bromination is complete as evidenced by the discharge of color (about 1½ hours), the solution is evaporated in vacuo to a residue. This residue is slurried with water, filtered and dried to yield 90 mg. of a solid substantially of 4β-bromo - 16α-(nitromethyl) pregnane-17α,21-diol-3,11,20-trione 21-acetate of which is used without further purification in the conversion described in the procedure immediately following.

F. 16α-(NITROMETHYL) CORTISONE 21-ACETATE

The 4β-bromo-16α-(nitromethyl) pregnane-17α,21-diol-3,11,20-trione 21-acetate of above Example 1E is dissolved in a mixture of 30 mg. of semicarbazide, 4 ml. of t-butyl alcohol and 2 ml. of methylene chloride, and the solution stirred in a nitrogen atmosphere for two hours at 25–30° C. The solvent is distilled in vacuo and the resulting residue dissolved in 5 ml. of 80% acetic acid-water along with excess 70% pyruvic acid. After standing at room temperature for 20 hours, the reaction mixture is brought to about pH 7 with dilute (5%) sodium hydroxide, and then is extracted with methylene chloride. The organic extracts are combined and evaporated to a residue, which is chromatographed on Florisil. The crystalline material (25 mg.) obtained from 50% ether-hexane and 100% ether eluates, is crystallized from acetone-hexane to yield 20 mg. of 16α-(nitromethyl) cortisone 21-acetate, $$\lambda_{max.}^{MeOH} \ 238 \ m\mu \ (\epsilon \ 14{,}500)$$

EXAMPLE 2

16α-(nitromethyl) cortisone

One gram of 16α-(nitromethyl) cortisone 21-acetate (prepared as in Example 1F) is dissolved in 25 ml. of methanol and 5 ml. of water containing 0.2 g. of potassium bicarbonate. This solution is refluxed for ½ hour, then concentrated in vacuo to a residue. Water is added to this residue, and the resulting precipitate is filtered, dried, and crystallized from acetone-hexane to give 16α-(nitromethyl-cortisone, $$\lambda_{max.}^{MeOH} \ 238 \ m\mu \ (\epsilon \ 14{,}200)$$

EXAMPLE 3

16α-(Nitromethyl) hydrocortisone

A. 16α-(NITROMETHYL) CORTISONE 3,20-BIS-SEMI-CARBAZONE

A mixture of 3.0 g. of 16α-(nitromethyl) cortisone, 5.0 g. of semicarbazide hydrochloride, 4 g. of pyridine, 30 ml. of water and 140 ml. of methanol is refluxed for 16 hours. The solution is then concentrated to about 30 ml. and poured into water to precipitate a solid substantially of 16α-(nitromethyl) cortisone-3,20-bis-semicarbazone which is used without further purification in the reaction immediately following.

B. 16α-(NITROMETHYL) HYDROCORTISONE 3,20-BIS-SEMICARBAZONE

A solution of 3.0 g. of the bis-semicarbazone of above Example 3A and 2 g. of potassium borohydride in 100 ml. of tetrahydrofuran and 50 ml. of water is refluxed for 6 hours. The solution is cooled, and acetic acid added until the solution is approximately pH 5.5. The organic solvent is distilled from the reaction mixture and the resulting solid precipitate in the aqueous residue is filtered to give 16α-(nitromethyl) hydrocortisone 3,20-bis-semicarbazone of sufficient purity to be used directly in the following reaction.

C. 16α-(NITROMETHYL) HYDROCORTISONE

Under a nitrogen atmosphere, 5.0 g. of the bis-semicarbazone of above Example 3A is dissolved in 250 ml. of 2.4 N-hydrochloric acid. The solution is cooled to 5° C., then 2.5 g. of sodium nitrite in 25 ml. of water is added over a 15 minute period at 5° C. The reaction mixture is stirred an additional 30 minutes, then cooled to below 15° C., neutralized with 20% sodium hydroxide, and extracted several times with chloroform. The solvent is evaporated under reduced pressure to give a solid residue which, after crystallization from acetone-hexane, yields 16α-(nitromethyl)-hydrocortisone, $$\lambda_{max.}^{MeOH} \ 240 \ m\mu \ (\epsilon \ 14{,}000)$$

EXAMPLE 4

16α-(nitromethyl) hydrocortisone 21-acetate

To 0.5 g. of 16α-(nitromethyl) hydrocortisone, prepared as in Example 3, there is added 0.3 ml. of acetic anhydride in 2.3 ml. of pyridine. After standing for one hour at room temperature, the mixture is poured into ice and hydrochloric acid. The resulting precipitate is filtered and recrystallized from aqueous methanol to yield 16α-(nitromethyl) hydrocortisone 21-acetate.

EXAMPLE 5

9α-bromo-16α-(nitromethyl) hydrocortisone 21-acetate

A. 16α-(NITROMETHYL)-4,9-PREGNADIENE-17α,21-DIOL-3,20-DIONE 21-ACETATE

To a solution of 16α-(nitromethyl) hydrocortisone 21-acetate (0.3 g.), prepared as in Example 4, in 5 ml. of pyridine there is added 0.2 ml. of benzenesulfonyl chloride in 3 ml. of pyridine. The solution is allowed to stand for 4 hours, then is poured into ice-hydrochloric acid. A solid precipitates which is filtered and crystallized from acetone-hexane to give 16α-(nitromethyl)-4,9-pregnadiene-17α,21-diol-3,20-dione 21-acetate, $$\lambda_{max.}^{MeOH} \ 239 \ m\mu \ (\epsilon \ 15{,}500)$$

B. 9α-BROMO-16α-(NITROMETHYL)HYDROCORTISONE 21-ACETATE

A suspension of 0.2 g. of the 16α-(nitromethyl)-4,9-pregnadiene of above Example 5A in 20 ml. of purified dioxane, 2 ml. of water and containing 0.1 g. of N-bromo-acetamide and 1 ml. of 1.5 N-perchloric acid is gently agitated for two hours. During this time the mixture becomes homogeneous. A solution of 0.2 g. of sodium sulfite in 2 ml. of water is then added, and the solution extracted with methylene chloride. The organic extracts are washed with water, dried and evaporated to a solid residue which is crystallized from acetone to give 9α-bromo-16α-(nitromethyl) hydrocortisone 21-acetate, $$\lambda_{max.}^{MeOH}\ 243\ m\mu\ (\epsilon\ 15,700)$$

EXAMPLE 6

9α-bromo-16α-(nitromethyl) hydrocortisone

A mixture of 0.3 g. of 9α-bromo-16α-(nitromethyl) hydrocortisone 21-acetate, prepared as in Example 5, in 50 ml. of methanol, 10 ml. of chloroform, 3 ml. of water and 3 ml. of concentrated hydrochloric acid is allowed to stand 48 hours at room temperature. Water is then added, and the mixture extracted with methylene chloride. The organic extracts are washed with water, dried and concentrated to a residue. Crystallization of this residue from acetone yields 9α-bromo-16α-(nitromethyl) hydrocortisone.

EXAMPLE 7

9α-fluoro-16α-(nitromethyl) hydrocortisone 21-acetate

A. 9β,11β-OXIDO-16α-(NITROMETHYL)-4-PREGNENE-17α,21-DIOL-3,20-DIONE 21-ACETATE

To 9α-bromo-16α-(nitromethyl) hydrocortisone 21-acetate (0.3 g.), prepared as in Example 5, in 20 ml. of methanol there is added 0.3 g. of potassium acetate. The mixture is refluxed for 2 hours, then concentrated in vacuo to a residue. Water is added to the residue, and a solid separates which is filtered and crystallized from methanol-water to give 0.1 g. of 9β,11β-oxido-16α-(nitromethyl)-4-pregnene-17α,21-diol-3,20-dione 21-acetate.

B. 9α-FLUORO-16α-(NITROMETHYL) HYDROCORTISONE 21-ACETATE

A solution of 0.1 g. of the 9β,11β-oxido-4-pregnene of above Example 7A in 5 ml. of alcohol-free chloroform is saturated with anhydrous hydrogen fluoride at 0° C. The mixture is allowed to stand 4 hours at 0° C., then concentrated to a residue in vacuo, which when crystallized from acetone-hexane gives 50 mg. of 9α-fluoro-16α-(nitromethyl) hydrocortisone 21-acetate.

EXAMPLE 8

9α-fluoro-16α-(nitromethyl) hydrocortisone

9α-fluoro-16α-(nitromethyl) hydrocortisone 21-acetate, prepared as in Example 7, is hydrolyzed with hydrochloric acid in chloroform-water in the manner described in Example 6 to give 9α-fluoro-16α-(nitromethyl) hydrocortisone.

EXAMPLE 9

9α-chloro-16α-(nitromethyl) hydrocortisone 21-acetate

A solution of 0.3 g. of the 9β,11β-oxido-4-pregnene of Example 7A in 40 ml. of alcohol-free chloroform is saturated at 0° C. with anhydrous hydrogen chloride, and the mixture allowed to stand at 0° C. for six hours. The solvent is distilled in vacuo from the reaction mixture leaving a residue which, when crystallized from acetone-water, gives 0.2 g. of 9α-chloro-16α-(nitromethyl) hydrocortisone, $$\lambda_{max.}^{MeOH}\ 241\ m\mu\ (\epsilon\ 15,900)$$

EXAMPLE 10

9α-chloro-16α-(nitromethyl) hydrocortisone

In the manner described in Example 6, 9α-chloro-16α-nitromethyl) hydrocortisone 21-acetate, prepared as in Example 9, is converted to 9α-chloro-16α-(nitromethyl) hydrocortisone by means of hydrochloric acid in methanol-chloroform-water.

EXAMPLE 11

16α-(nitromethyl) prednisone 21-acetate

A. 2,4-DIBROMO-16α-(NITROMETHYL) PREGNANE-17α,21-DIOL-3,11,20-TRIONE 21-ACETATE

A solution of 180 mg. of 16α-(nitromethyl) pregnane-17α,21-diol-3,11,20-trione 21-acetate, the compound of Example 1D, in 3 ml. of dioxane is dibrominated in positions 2 and 4 by the rapid addition of 130 mg. of bromine in 1 ml. of dioxane at room temperature. The solution is poured into water and the precipitated solid is filtered, yielding 190 mg. of 2,4-dibromo-16α-(nitromethyl) pregnane-17α,21-diol-3,11,20-trione 21-acetate of sufficient purity to be used in the conversion described in the following procedure.

B. 16α-(NITROMETHYL) PREDNISONE 21-ACETATE

The 2,4-dibromide (190 mg.) prepared as in above Example 11A, is dehydrobrominated by refluxing for 2 hours with 4 ml. of dimethylformamide containing 30 mg. of lithium carbonate and 30 mg. of lithium bromide. The mixture is poured into dilute hydrochloric acid and extracted with methylene chloride. The organic extract is evaporated to a residue (155 mg), which is chromatographed on Florisil. The fractions obtained by elution with 20% ether-hexane are crystallized from acetone-hexane to give 80 mg. of 16α-(nitromethyl) prednisone 21-acetate, $$\lambda_{max.}^{MeOH}\ 237\ m\mu\ (\epsilon\ 14,600)$$

EXAMPLE 12

16α-(nitromethyl) prednisone

16α-(nitromethyl) prednisone 21-acetate (0.5 g.), the compound of Example 11, when hydrolyzed by means of aqueous alcoholic potassium bicarbonate in the manner described in Example 2, yields 16α-(nitromethyl) prednisone.

A further method of preparation of the compound of this example is as follows:

*Bacillus sphaericus* var. *fusiformis* (A.T.C.C. 7055) is incubated on a nutrient agar (composed of Bacto-beef extract, 3 g., Bacto-peptone, 5 g.; sodium chloride, 8 g.; agar, 15 g.; tap water, 1 liter) for 24 hours at 28° C.

To 100 ml. of a sterile nutrient broth (composed of Bacto-beef extract, 3 g.; Bacto-peptone, 5 g.; per liter of tap water) in a 300 ml. flask is added one loopful of the incubated culture and the broth mixture is further incubated for 24 hours at 28° C. on a shaking machine. The broth culture so obtained is employed as an inoculum (1%).

Into each of ten flasks containing 100 ml. of sterile nutrient broth is added 1 ml. of the inoculum. The flasks are agitated on a rotary shaker for 8 hours at 28° C. and 240 strokes per minute. After this growth period, a solution of 25 mg. of 16α-(nitromethyl) cortisone (the compound of Example 2, in 0.5 ml. of methanol is aseptically added to each flask which in turn is reshaken and incubated for an additional 24 hours. The final pH is 7.8.

The contents of the flasks are then combined and extracted three times with 2 liters of chloroform per extraction. The combined chloroform extracts are evaporated to dryness yielding 310 mg. of crude product. The crude steroid is purified by chromatography on a chromatographic system described by G. M. Shull, Abstracts of Papers of the 126th Meeting of the American Chemical Society, December 12–17, 1954, page 9a, paper No. 24. Chromatographic evaluation shows a quantitative conversion of the starting material to the diene when an authentic sample of the 16α-(nitromethyl) prednisone is used as a control.

Alternatively, the crude product is recrystallized from acetone affording 210 mg. of 16α-(nitromethyl) prednisone.

EXAMPLE 13

16α-(nitromethyl) prednisolone

16α-(nitromethyl) hydrocortisone, the compound of Example 3, is fermented by means of *Bacillus sphaericus* var. *fusiformis* (A.T.C.C. 7055) in the manner described in the alternate procedure of Example 12 to produce 16α-(nitromethyl) prednisolone.

EXAMPLE 14

16α-(nitromethyl) prednisolone 21-acetate

16α-(nitromethyl) prednisolone of Example 13, is treated with acetic acid and pyridine in the manner described in Example 4 to yield 16α-(nitromethyl) prednisolone 21-acetate.

EXAMPLE 15

9α-bromo-16α-(nitromethyl) prednisolone 21-acetate

A. 16α-(NITROMETHYL)-1,4-9(11)-PREGNATRIENE-17α,21-DIOL-3,20-DIONE 21-ACETATE

A solution of 0.5 g. of 16α-(nitromethyl) prednisolone 21-acetate, the compound of Example 14, in 3 ml. of pyridine is reacted with 0.3 ml. of methane-sulfonyl chloride in 4 ml. of pyridine. The solution is allowed to stand for 8 hours, then poured into ice-hydrochloric acid. A solid precipitate is removed by filtration and crystallized from methanol-water to give 16α-(nitromethyl)1,4,9(11)-pregnatriene-17α,21-diol-3,20-dione 21-acetate, $\lambda_{max.}^{MeOH}$ 228 mμ (ε 15,100)

B. 9α-BROMO-16α-(NITROMETHYL) PREDNISOLONE 21-ACETATE

A suspension of 0.3 g. of the 16α-(nitromethyl) pregnatriene of above Example 15A in 30 ml. of purified dioxane to which has been added 3 ml. of water containing 0.15 g. of N-bromoacetamide and 1.5 ml. of 1.5 N perchloric acid, is gently agitated for a period of two hours, during which time the mixture becomes homogeneous. A solution of 0.3 g. of sodium sulfite in 3 ml. of water is then added, and the reaction mixture is extracted with methylene chloride. The organic extracts are washed with water, dried over magnesium sulfate, filtered and evaporated. The resulting solid is crystallized from acetone to yield 0.2 g. of 9α-bromo-16α-(nitromethyl) prednisolone 21-acetate, $\lambda_{max.}^{MeOH}$ 242 mμ (ε 15,200)

EXAMPLE 16

9α-BROMO-16α-(NITROMETHYL) PREDNISOLONE

A gram of 9α-bromo-16α-(nitromethyl)-prednisolone 21-acetate prepared as in Example 15 is hydrolyzed with hydrochloric acid in chloroform-methanol-water in the manner described in Example 6 to give 9α-bromo-16α-(nitromethyl) prednisolone.

EXAMPLE 17

9α-fluoro-16α-(nitromethyl) prednisolone 21-acetate

A. 9β,11β-OXIDO-16α-(NITROMETHYL)-1,4-PREGNADIENE-17α,21-DIOL-3,20-DIONE 21-ACETATE

One gram of 9α-bromo-16α-(nitromethyl) prednisolone 21-acetate, the compound of Example 15, is added to 65 ml. of methanol and 1.0 g. of potassium acetate and the mixture is refluxed for 2 hours, then concentrated to a residue. Water is added to the residue and the resulting solid is removed by filtration and crystallized from methanol-water to give 0.7 g. of 9β,11β-oxido - 16α - (nitromethyl) - 1,4 - pregnadiene - 17α,21-diol-3,20-dione 21-acetate, $\lambda_{max.}^{MeOH}$ 242 mμ (ε 14,200)

B. 9α-FLUORO-16α-(NITROMETHYL) PREDNISOLONE 21-ACETATE

A solution of 0.2 g. of the 9β,11β-oxido-1,4-pregnadiene of Example 17A in 20 ml. of alcohol-free chloroform is saturated with anhydrous hydrogen fluoride at 0° C. The mixture is allowed to stand 4 hours at 0° C., then concentrated to a residue under reduced pressure. Crystallization of the residue from acetone-hexane gives 0.1 g. 9α-fluoro-16α-(nitromethyl) prednisolone 21-acetate, $\lambda_{max.}^{MeOH}$ 238 mμ (ε 15,250)

EXAMPLE 18

9α-fluoro-16α-(nitromethyl) prednisolone

9α-fluoro-16α-(nitromethyl) prednisolone 21-acetate, the compound of Example 17, is converted to 9α-fluoro-16β-methylprednisolone by means of hydrochloric acid in methanol-chloroform-water in the manner described in Example 6.

EXAMPLE 19

9α-chloro-16α-(nitromethyl) prednisolone 21-acetate

A solution of 0.2 g. of 9β,11β-oxido 16α-(nitromethy-l)-1,4-pregnadiene-17α,21-diol-3,20-dione 21-acetate, the compound of Example 15A, in 30 ml. of alcohol-free chloroform is saturated at 0° C. with anhydrous hydrogen chloride, and the mixture allowed to stand at 0° C. for 6 hours. The mixture is concentrated under reduced pressure to a residue which is crystallized from acetone-water to give 0.15 g. of 9α-chloro-16α-(nitromethyl) prednisolone 21-acetate, $\lambda_{max.}^{MeOH}$ 240 mμ (ε 14,900)

EXAMPLE 20

9α-chloro-16α-(nitromethyl) prednisolone

In the manner of Example 6, 9α-chloro-16α-(nitromethyl) prednisolone 21-acetate is converted to 9α-chloro-16α-(nitromethyl) prednisolone.

EXAMPLE 21

9α-fluoro-16α-(nitromethyl) prednisone 21-acetate

To a solution of 0.2 g. of 9α-fluoro-16α-(nitromethyl) prednisolone 21-acetate, the compounds of Example 17, in 10 ml. of acetic acid is added dropwise a solution of 40 mg. of chromium trioxide in 1 ml. of water and 3 ml. of acetic acid. The resulting mixture is allowed to stand 5 hours, then diluted with water and extracted with methylene chloride. The organic extracts are washed with water, dried over magnesuim sulfate, filtered and evaporated leaving a residue which is crystallized from methanol to give 0.1 g. of 9α-fluoro-16α-(nitromethyl) prednisone 21-acetate.

EXAMPLE 22

9α-fluoro-16α-(nitromethyl) prednisone

In the manner described in Example 6, 9α-fluoro-16α-(nitromethyl) prednisone 21-acetate, the compound of Example 21, is hydrolyzed to 9α-fluoro-16α-(nitromethyl) prednisone by means of HCl in methanol-chloroform water.

EXAMPLE 23

9α-chloro-16α-(nitromethyl) prednisone

A. 9α-CHLORO-16α-(NITROMETHYL) PREDNISONE 21-ACETATE

9α-chloro-16α-(nitromethyl) prednisolone 21-acetate, the compound of Example 19, is reacted with chromium trioxide in aqueous acetic acid in the manner of Example 21 to give 9α-chloro-16α-(nitromethyl) prednisone 21-acetate.

B. 9α-CHLORO-16α-(NITROMETHYL) PREDNISONE

In the manner described in Example 6, the 21-acetate ester of Example 23A is reacted with hydrochloric acid in methanol-chloroform water to give 9α-chloro-16α-(nitromethyl) prednisone.

EXAMPLE 24

*9α-bromo-16α-(nitromethyl) prednisone*

A. 9α-BROMO-16α-(NITROMETHYL) PREDNISONE 21-ACETATE

9α-bromo-16α-(nitromethyl) prednisolone 21-acetate, the compound of Example 15, is reacted with chromium trioxide in aqueous acetic acid in the manner of Example 21 to give 9α-bromo-16α-(nitromethyl) prednisone 21-acetate.

B. 9α-BROMO-16α-(NITROMETHYL) PREDNISONE

In the manner of Example 6, the 21-acetate ester of Example 24A, is reacted with hydrochloric acid in methanol-chloroform-water to give 9α-bromo-16α-(nitromethyl) prednisone.

EXAMPLE 25

*16α-(α-nitropropyl) cortisone*

A. 16α-(α-NITROPROPYL) PREGNANE-3α-OL-11,20-DIONE

In the manner described in Example 1A, 16-pregnene-3α-ol-11,20-dione 3-acetate is reacted with 1-nitropropane to give 16α-(α-nitropropyl) pregnane-3α-ol-11,20-dione.

B. 16α-(α-NITROPROPYL) PREGNANE-3α,17α-DIOL-11,20-DIONE

The 16α-(α-nitropropyl) pregnane of above Example 25A is treated in the manner described in Example 1B, and the resulting product isolated and purified in the described manner to give 16α-(α-nitropropyl) pregnane-3α,17α,diol-11,20-dione.

C. 16α-(α-NITROPROPYL) PREGNANE-3α,17α,21-TRIOL-11,20-DIONE 21-ACETATE

The 16α-(α-nitropropyl) pregnane of above Example 25B is first brominated and then reacted with dimethylformamide and sodium acetate in the manner described in Example 1C to give 16α-(α-nitropropyl) pregnane-3α,17α,21-triol-11,20-dione 21-acetate.

D. 16α-(α-NITROPROPYL) PREGNANE-17α,21-DIOL-3, 11,20-TRIONE 21-ACETATE

The 16α-(α-nitropropyl) pregnane-triol of above Example 25C is reacted with N-bromosuccinimide in the manner of Example 1D to give 16α-(α-nitropropyl) pregnane-17α,21-diol-3,11,20-trione 21-acetate.

E. 4β-BROMO-16α-(α-NITROPROPYL) PREGNANE-17α, 21-DIOL-3,11,20-TRIONE 21-ACETATE

The 16α-(α-nitropropyl)-pregnane of above Example 25D is brominated in the manner described in Example 1E to give 4β-bromo-16α-(α-nitropropyl) pregnane-17α,21-diol-3,11,20-trione 21-acetate.

F. 16α-(α-NITROPROPYL) CORTISONE 21-ACETATE

The 4β-bromopregnane of above Example 25E is first reacted with semicarbazide and thence with 80% acetic acid-water and 70% pyruvic acid in the manner described in Example 1F to give 16α-(α-nitropropyl) cortisone 21-acetate.

G. 16α-(α-NITROPROPYL) CORTISONE

The 21-acetate of above Example 25F is hydrolyzed with potassium bicarbonate in methanol-water in the manner described in Example 2 to give 16α-(α-nitropropyl) cortisone.

EXAMPLE 26

*16α-(nitromethyl)-prednisone 21-acetate*

A. 16α-(NITROMETHYL)-ALLOPREGNANE-3β-OL-11,20-DIONE

A solution of 2 g. of 16-allopregnene-3β-ol-11,20-dione 3-acetate in 50 ml. of t-butyl alcohol containing about 1 g. of potassium t-butylate is reacted with 3 ml. of nitromethane in the manner described in Example 1A. The resultant product is isolated and purified in the described manner to give 16α-(nitromethyl)-allopregnane-3β-ol-11,20-dione.

B. 16α-(NITROMETHYL)-ALLOPREGNANE-3β,17α-DIOL-11,20-DIONE

16α-(Nitromethyl) - allopregnane - 3β - ol-11,20-dione, prepared as in Example 26A is reacted with p-toluene sulfonic acid in acetic anhydride in the manner of Example 1B. The resultant product is isolated and purified to give 16α - (nitromethyl) - allopregnane-3β,17α-diol-11,20-dione.

C. 16α-(NITROMETHYL)-ALLOPREGNANE-3β,17α,21-TRIOL-11,20-DIONE 21-ACETATE

In the manner of Example 1C, 16α-(nitromethyl)-allopregnane-3β,17α-diol-11,20-dione, prepared as in Example 26B is brominated with bromine in chloroform and then treated with dimethyl formamide. The resultant product is isolated and purified in the described manner to give 16α-(nitromethyl)-allopregnane-3β,17α,21-triol-11,20-dione 21-acetate.

D. 16α-(NITROMETHYL)-ALLOPREGNANE-17α,21-DIOL-3,11,20-TRIONE 21-ACETATE

16α-(Nitromethyl) - allopregnane-3β,17α,21-triol-3,20-dione 21-acetate, the product of Example 26C, is reacted with N-bromosuccinimide in the manner described in Example 1D and the resultant product isolated and purified to give 16α-(nitromethyl)-allopregnane-17α,21-diol-3,11,20-trione 21-acetate.

E. 2,4-DIBROMO-16α-(NITROMETHYL)-ALLOPREGNANE-17α,21-DIOL-3,11,20-TRIONE 21-ACETATE

16α-(Nitromethyl) - allopregnane - 17α,21-diol-3,11,20-trione 21-acetate, the compound of Example 26D, is dibrominated in the manner of Example 11A and the resultant product is isolated yielding a product substantially of 2,4-dibromo - 16α-(nitromethyl)-allopregnane-17α,21-diol-3,11,20-trione 21-acetate, of sufficient purity to be used in the conversion described in the following procedure.

F. 16α-(NITROMETHYL)-PREDNISONE 21-ACETATE

The 2,4-dibromide prepared as in above Example 26E is dehydrobrominated by means of dimethyl formamide in the manner of Example 11B. The resultant product is isolated and purified in the described manner to give 16α-(nitromethyl)-prednisone 21-acetate $\lambda_{max.}^{MeOH}$ 237 mμ (ε 14,600)

EXAMPLE 27

*16α-(nitromethyl)-cortisone 21-acetate*

A. 2-IODO-16α-(NITROMETHYL)-CORTISONE 21-ACETATE

A solution of 1.0 g. of 2,4-dibromo-16α-(nitromethyl)-allopregnane-17α,21-diol-3,11,20-trione 21-acetate, prepared as in Example 26E, in 50 ml. of acetone containing 2.12 g. of sodium iodide is refluxed under nitrogen for 2½ hours. Excess of 0.1 N sodium thiosulfate solution is then added to remove iodine, then water is added and the mixture extracted with methylene chloride. The organic extracts are combined and evaporated to give a residue substantially of 2-iodo-16α-(nitromethyl)-cortisone acetate which is used without further purification in the reaction immediately following.

B. 16α-(NITROMETHYL)-CORTISONE 21-ACETATE

The 2-iodo-16α-(nitromethyl)-cortisone 21-acetate prepared in above Example 27A is dissolved in 50 ml. of acetone and treated with 20 ml. of ca. 1 N chromous chloride under nitrogen. After standing 1 hour, water is added and the mixture extracted with methylene chloride.

The organic extracts are washed with water, dried and evaporated to a residue. Crystallization of this residue from acetone-hexane gives 16α-(nitromethyl)-cortisone acetate.

EXAMPLE 28

*16α-(α-nitrobutyl) cortisone*

A. 16α-(α-NITROBUTYL) PREGNANE-3α-OL-11,20-DIONE

In the manner described in Example 1A, 16-pregnene-3α-ol-11,20-dione 3-acetate is reacted with 1-nitrobutane to give 16α-(α-nitrobutyl) pregnane-3α-ol-11,20-dione.

B. 16α-(α-NITROBUTYL) PREGNANE-3α,17α-DIOL-11,20-DIONE

The 16α-(α-nitrobutyl) pregnane of above Example 28A is treated in the manner described in Example 1B, and the resulting product isolated and purified in the described manner to give 16α-(α-nitrobutyl) pregnane-3α,17α-diol-11,20-dione.

C. 16α-(α-NITROBUTYL) PREGNANE-3α,17α,21-TRIOL-11,20-DIONE 21-ACETATE

The 16α-(α-nitrobutyl) pregnane of above Example 28B is first brominated and then reacted with dimethylformamide and sodium acetate in the manner described in Example 1C to give 16α-(α-nitrobutyl) pregnane-3α,17α,21-triol-11,20-dione 21-acetate.

D. 16α-(α-NITROBUTYL) PREGNANE-17α,21-DIOL-3,11,20-TRIONE 21-ACETATE

The 16α-(α-nitrobutyl) pregnane-triol of above Example 28C is reacted with N-bromosuccinimide in the manner of Example 1D to give 16α-(α-nitrobutyl) pregnane-17α,21-diol-3,11,20-trione 21-acetate.

E. 4β-BROMO-16α-(α-NITROBUTYL) PREGNANE-17α,21-DIOL-3,11,20-TRIONE 21-ACETATE

The 16α-(α-nitrobutyl) pregnane of above Example 28D is brominated in the manner described in Example 1E to give 4β-bromo-16α-(α-nitrobutyl) pregnane-17α,21-diol-3,11,20-trione 21-acetate.

F. 16α-(α-NITROBUTYL) CORTISONE 21-ACETATE

The 4β-bromopregnane of above Example 28E is first reacted with semicarbazide and thence with 80% acetic acid-water and 70% pyruvic acid in the manner described in Example 1F to give 16α-(α-nitrobutyl) cortisone 21-acetate.

G. 16α-(α-NITROBUTYL) CORTISONE

The 21-acetate of above Example 28F is hydrolyzed with potassium bicarbonate in methanol-water in the manner described in Example 2 to give 16α-(α-nitrobutyl) cortisone.

EXAMPLE 29

*9α-fluoro-16α-(nitromethyl) cortisone 21-acetate*

To a solution of 0.3 g. of the 21-acetate of 9α-fluoro-16α-(nitromethyl) hydrocortisone prepared as described in Example 7 in 15 ml. of acetone is added dropwise a solution of 60 mg. of chromium trioxide in 1 ml. of water and 3 ml. of acetic acid. The resulting mixture is allowed to stand for a period of about 5 hours, then diluted with water and extracted with methylene chloride. The organic extracts are washed with water, dried over magnesium sulfate, filtered and evaporated in a residue which is crystallized from methanol to give 0.1 g. of 9α-fluoro-16α-(nitromethyl) cortisone 21-acetate.

EXAMPLE 30

*9α-fluoro-16α-(nitromethyl) cortisone*

The 21-acetate of 9α-fluoro-16α-(nitromethyl) cortisone of Example 29 is hydrolyzed with potassium bicarbonate in methanol water in the manner described in Example 2 to give 9α-fluoro-16α-(nitromethyl) cortisone.

We claim:
1. A 16α-(α-nitroalkyl)-pregnene having the formula:

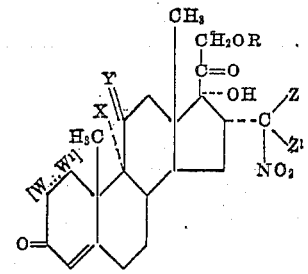

wherein [W . . . W¹] is a member selected from the group consisting of —CH₂—CH₂— and —CH=CH—; Y is a member selected from the group consisting of O, (H,αOH) and (H,βOH); X is a member selected from the group consisting of H and a halogen atom, said halogen atom having an atomic weight of less than 125, and X is H when Y is (H,αOH); each of Z and Z¹ is a member selected from the group consisting of H and alkyl radicals; and R is a member selected from the group consisting of H and acyl.

2. Compounds of the following general formula:

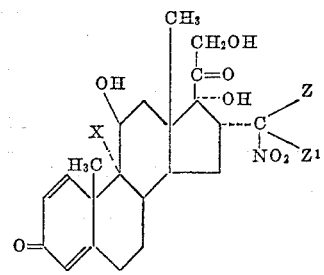

wherein X is a halogen of atomic weight less than 125; and each of Z and Z¹ is lower alkyl.

3. The 21-lower alkanoates of the compounds of claim 2.

4. Compound of the following general formula:

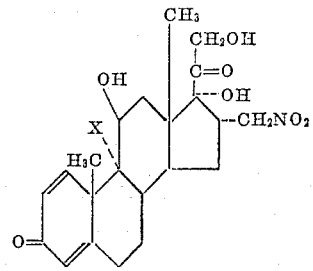

wherein X is a halogen of atomic weight less than 125.

5. The 21-lower alkanoates of the compounds of claim 4.

6. Compounds of the following general formula:

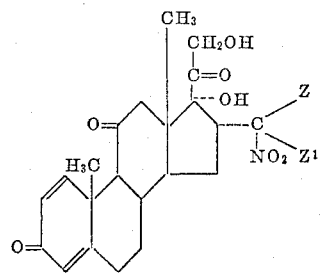

wherein each of Z and Z¹ is lower alkyl.

7. The 21-lower alkanoates of the compounds of claim 6.

8. Compounds of the following general formula:

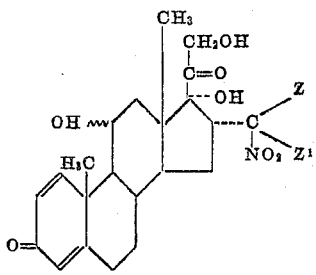

wherein each of Z and $Z^1$ is lower alkyl.
9. The 21-lower alkanoates of the compounds of claim 8.
10. 9α-fluoro-16α-(nitromethyl) cortisone.
11. 9α-fluoro-16α-(nitromethyl) cortisone 21-acetate.
12. 9α-fluoro-16α-(nitromethyl) hydrocortisone.
13. 9α-fluoro-16α-(nitromethyl) hydrocortisone 21-acetate.
14. 9α-fluoro-16α-(nitromethyl) prednisone.
15. 9α-fluoro-16α-(nitromethyl) prednisone 21-acetate.
16. 9α-fluoro-16α-(nitromethyl) prednisolone.
17. 9α-fluoro-16α-(nitromethyl) prednisolone 21-acetate.
18. 16α-(nitromethyl) cortisone.
19. 16α-(nitromethyl) cortisone 21-acetate.
20. 16α-(nitromethyl) hydrocortisone.
21. 16α-(nitromethyl) hydrocortisone 21-acetate.
22. 16α-(nitromethyl) prednisone.
23. 16α-(nitromethyl) prednisone 21-acetate.
24. 16α-(nitromethyl) prednisolone.
25. 16α-(nitromethyl) prednisolone 21-acetate.

References Cited in the file of this patent
UNITED STATES PATENTS

| | | |
|---|---|---|
| 2,671,084 | Lincoln et al. | Mar. 2, 1954 |
| 2,697,109 | Dodson | Dec. 14, 1954 |
| 2,794,815 | Dodson | June 4, 1957 |